United States Patent
Cocchi et al.

(10) Patent No.: US 10,206,413 B2
(45) Date of Patent: Feb. 19, 2019

(54) MACHINE AND METHOD FOR MAKING ICE CREAM

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.— CARPIGIANI GROUP, Milan (IT)

( * ) Notice: Subject to any disclaimer, the term of this patent is extended or adjusted under 35 U.S.C. 154(b) by 12 days.

(21) Appl. No.: 15/043,811

(22) Filed: Feb. 15, 2016

(65) Prior Publication Data

US 2016/0235087 A1 Aug. 18, 2016

(30) Foreign Application Priority Data

Feb. 17, 2015 (IT) .............................. BO2015A0076

(51) Int. Cl.
*A23G 9/52* (2006.01)
*A23G 9/12* (2006.01)
(Continued)

(52) U.S. Cl.
CPC ................. *A23G 9/12* (2013.01); *A23G 9/04* (2013.01); *A23G 9/08* (2013.01); *A23G 9/22* (2013.01);
(Continued)

(58) Field of Classification Search
CPC . A23G 9/08; A23G 9/12; A23G 9/305; A23G 9/52; A23G 9/22; A23G 9/04;
(Continued)

(56) References Cited

U.S. PATENT DOCUMENTS 1,414,214 A * 4/1922 Sanna ....................... A23G 9/40
  426/491
1,485,069 A * 2/1924 Wilson ..................... A23G 9/04
  426/565
(Continued)

FOREIGN PATENT DOCUMENTS

CA         534666 A   * 12/1956
GB         1118808 A     7/1968
(Continued)

OTHER PUBLICATIONS

R. Paul Singh & Dennis R. Heldman, Introduction to Food Engineering, Second Edition, 1993, p. 462.*
(Continued)

*Primary Examiner* — Drew E Becker
(74) *Attorney, Agent, or Firm* — Shuttleworth & Ingersoll, PLC; Timothy J. Klima

(57) ABSTRACT

A method for making ice cream, including the following steps:
  a) preparing basic ingredients defining a basic mixture for ice cream;
  b) heating the basic mixture to cause an at least partial evaporation of the water contained in the basic ingredients, so as to make a basic mixture concentrate;
  c) subjecting the basic mixture concentrate to a mixing and cooling treatment comprising the steps of:
  c1) adding a basic liquid to the mixture concentrate, so as to dilute the mixture;
  c2) stirring and simultaneous thermal treatment for a predetermined period of time, to allow converting the diluted basic mixture concentrate into an ice cream type product.

11 Claims, 1 Drawing Sheet

(51) Int. Cl.
*A23L 5/00* (2016.01)
*B65D 85/78* (2006.01)
*A23G 9/30* (2006.01)
*A23G 9/04* (2006.01)
*A23G 9/08* (2006.01)
*A23G 9/22* (2006.01)
*B65D 81/00* (2006.01)

(52) U.S. Cl.
CPC .............. *A23G 9/305* (2013.01); *A23G 9/52* (2013.01); *A23L 5/51* (2016.08); *A23L 5/55* (2016.08); *B65D 85/78* (2013.01); *B65D 2081/001* (2013.01)

(58) Field of Classification Search
CPC ... A23L 2/385–2/395; A23L 5/51–5/55; A23L 3/44; A23B 4/037; A23B 5/03; A23B 7/024; B65D 2081/001; B65D 2081/008; B65D 85/60; B65D 85/78
USPC ............... 426/519, 524, 115, 112, 130, 515, 426/384–385
See application file for complete search history.

(56) References Cited

U.S. PATENT DOCUMENTS

| | | | | |
|---|---|---|---|---|
| 1,699,526 A * | 1/1929 | Fisher | A23G 9/40 | 426/565 |
| 2,307,234 A * | 1/1943 | Otting | A23C 9/146 | 426/271 |
| 2,325,534 A * | 7/1943 | Murray | A23G 9/305 | 426/488 |
| 2,433,276 A * | 12/1947 | Hipple | A23G 9/32 | 426/565 |
| 2,558,453 A * | 6/1951 | Minster | A23G 9/46 | 426/306 |
| 2,663,642 A * | 12/1953 | Whitaker | A23C 1/12 | 426/491 |
| 2,738,279 A * | 3/1956 | Stimpson | A23C 9/1206 | 426/34 |
| 2,917,745 A * | 12/1959 | Kelley | A23L 25/30 | 426/385 |
| 3,017,276 A * | 1/1962 | Knightly | A23G 9/32 | 426/566 |
| 3,215,532 A * | 11/1965 | Bassett | A23G 9/52 | 426/334 |
| 3,464,834 A * | 9/1969 | Laskin | A23C 1/08 | 426/385 |
| 3,821,442 A * | 6/1974 | MacDonald et al. | A23G 3/02 | 426/327 |
| 5,370,893 A * | 12/1994 | Carey | A23G 9/52 | 426/443 |
| 2003/0134024 A1* | 7/2003 | Malone | A23G 9/00 | 426/565 |
| 2005/0163902 A1* | 7/2005 | Barfod | A21D 2/16 | 426/444 |
| 2007/0031565 A1* | 2/2007 | Schlegel | A23G 9/04 | 426/565 |
| 2007/0275131 A1* | 11/2007 | Bertini | A23G 9/00 | 426/115 |
| 2008/0089983 A1* | 4/2008 | Coste | A23G 9/04 | 426/106 |
| 2008/0311260 A1* | 12/2008 | Jager | A23L 3/44 | 426/385 |
| 2013/0164428 A1* | 6/2013 | Gordon | A23G 9/327 | 426/548 |
| 2013/0243918 A1* | 9/2013 | Romano | A23G 9/221 | 426/421 |
| 2014/0335232 A1* | 11/2014 | Beth Halachmi | A23G 9/00 | 426/87 |
| 2016/0214787 A1* | 7/2016 | Iotti | A47J 31/407 | |
| 2016/0255849 A1* | 9/2016 | Diekhaus | A23C 1/08 | |
| 2016/0302443 A1* | 10/2016 | Lazzarini | A23G 9/227 | |

FOREIGN PATENT DOCUMENTS

| | | |
|---|---|---|
| JP | 2002306062 A | 10/2002 |
| KR | 100750283 B1 | 8/2007 |
| KR | 20130133345 A | 12/2013 |
| KR | 101435023 B1 | 8/2014 |
| WO | WO2013121421 A1 | 8/2013 |

OTHER PUBLICATIONS

Italian Search Report dated Oct. 15, 2015 from counterpart Italian App No. BO20150076.
Database WPI, Week 201305, Thomson Scientific, London, GB, AN 2013-X31562, XP002746509.
Geilman W G et al: "Physical Characteristics of Frozen Desserts Made From Ultrafiltered Milk and Various Carbohydrates", Journal of Dairy Science, American Dairy Science Association, US, vol. 75, No. 10, Oct. 1992 (Oct. 1992), pp. 2670-2675, XP000306570, ISSN: 0022-0302, DOI: 10.3168/JDS.S0022-0302(92)78028-X.

* cited by examiner

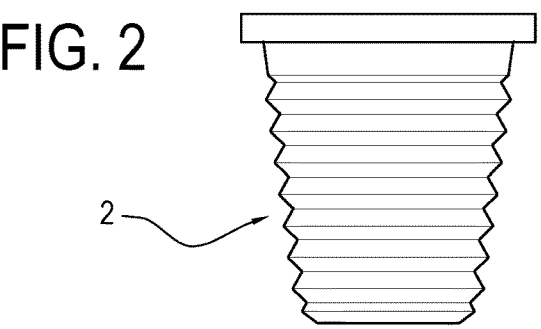
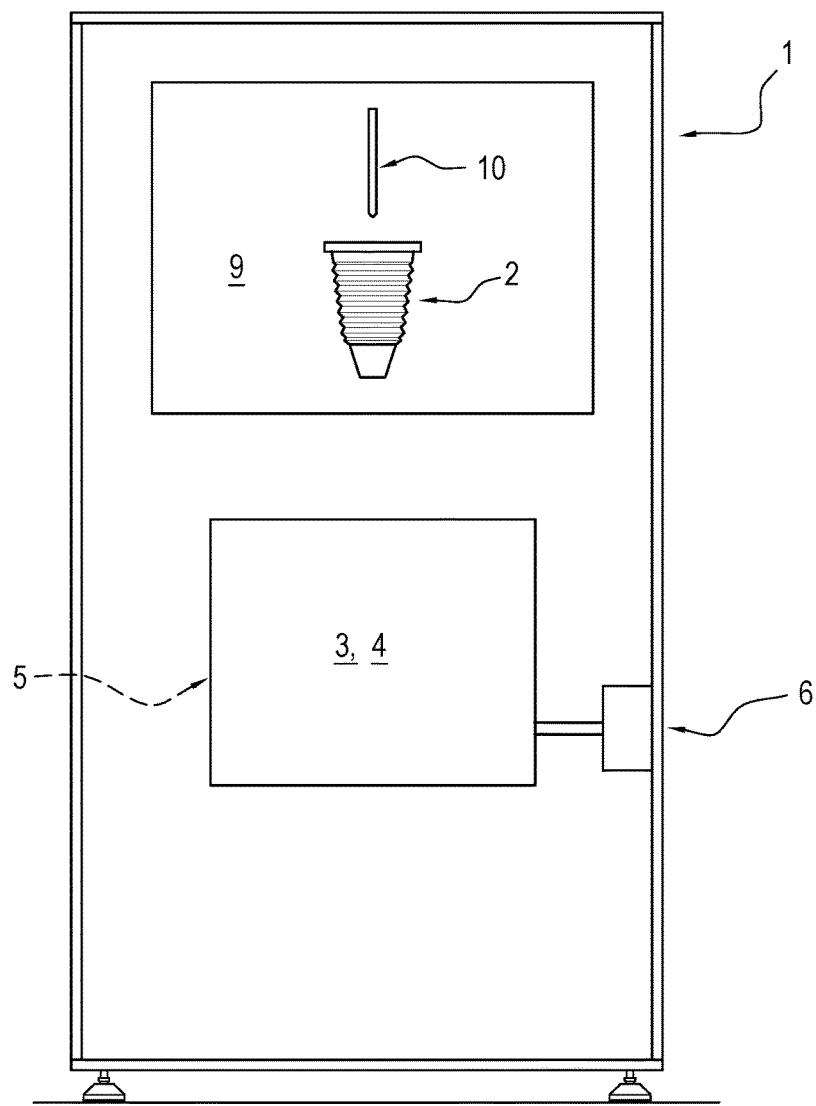

MACHINE AND METHOD FOR MAKING ICE CREAM

This application claims priority to Italian Patent Application BO2015A000076 filed Feb. 17, 2015, the entirety of which is incorporated by reference herein.

BACKGROUND OF THE INVENTION

This invention relates to a method and a machine for making ice cream.

As is known, a need which is strongly felt by operators in the trade is that of having alternative methods of making ice cream.

In particular, one of the needs which is most strongly felt in the trade in question is that of being able to make ice cream in a particularly simple manner and, if necessary, even in small quantities.

SUMMARY OF THE INVENTION

The aim of this invention is to provide a method and a machine for making ice cream to meet the above mentioned need.

A further aim of the invention is to provide a method and a machine for making ice cream which allow ice cream to be made even in small quantities.

According to the invention, this aim is achieved by a method and a machine for making ice cream and comprising technical features as disclosed herein.

BRIEF DESCRIPTION OF THE DRAWINGS

The technical features of the invention, with reference to the above aims, are clearly described herein and its advantages are apparent from the detailed description which follows, with reference to the accompanying drawings which illustrate a non-limiting example embodiment of the invention and in which:

FIG. 1 is a schematic view of a machine according to this invention;

FIG. 2 shows an enlarged detail of the machine of the preceding figure.

DESCRIPTION OF THE PREFERRED EMBODIMENTS

With reference to the accompanying drawings, the numeral 1 denotes a machine for making ice cream (preferably artisan gelato).

In the context of the invention, the term "ice cream" is used to mean a food preparation which is based on milk or milk-derived products and to which fruit, aromatics or other ingredients are added to obtain different flavors.

Also defined according to the invention is a method for making ice cream, comprising the following steps:

a) preparing basic ingredients defining a basic mixture for ice cream;

b) heating the basic mixture to cause an at least partial evaporation (if necessary, even more than 50%) of the water contained in the basic ingredients, so as to make a basic mixture concentrate;

c) subjecting the basic mixture concentrate to a mixing and cooling treatment comprising the steps of:

c1) adding a basic liquid to the mixture concentrate, so as to dilute the mixture;

c2) stirring and simultaneous thermal treatment for a predetermined period of time, to allow converting the diluted basic mixture concentrate into an ice cream type product.

It should be noted that the expression "basic mixture concentrate" is used to mean a set of specific basic ingredients for an ice cream product, depending on the type of flavors to be made, and which have been subjected to a heat treatment in order to cause an at least partial evaporation of water (contained in the ingredients themselves).

Preferably, but not necessarily, the method may comprise a step of pasteurizing the basic ingredients prior to the step of heating the basic ingredients to cause an at least partial evaporation of the water contained in the basic ingredients.

The step of preparing the basic ingredients defining the basic mixture comprises a step of selecting and measuring out the ingredients.

Preferably, the step of heating the basic ingredients to cause an at least partial evaporation of the water contained in the basic ingredients comprises a step of subjecting the basic ingredients, during the heating, to a pressure below the atmospheric pressure (preferably between 7 kPa and 20 kPa).

Advantageously, the step of heating at a pressure below the atmospheric pressure allows the water contained in the ingredients to evaporate without simultaneously caramelizing the sugars and triggering the Maillard reaction, as occurs if the ingredients are heated at too high a temperature.

It should be noted that under these conditions of relatively low pressure, the saturation temperature of water (at which water changes state from liquid to steam) is, in effect, lower than 100° C. and hence, to cause the water contained in the basic ingredients to evaporate it is sufficient to heat the basic ingredients to a temperature less than 100° C.

Preferably, the step of heating the basic ingredients to cause an at least partial evaporation of the water contained in the basic ingredients comprises a step of heating the basic ingredients to a temperature ranging between 40° C. and 60° C. (that is, to a temperature corresponding to the saturation temperature associated with the pressure which the basic ingredients are subjected to).

More precisely, the step of heating the basic ingredients to cause an at least partial evaporation of the water contained in the basic ingredients comprises a step of heating the basic ingredients to a temperature corresponding to the saturation temperature associated with the pressure which the basic ingredients are subjected to.

With reference to the step of pasteurizing the basic ingredients, it should be noted that this step comprises heating the basic ingredients to a predetermined heating temperature, maintained for a predetermined length of time.

According to a first pasteurizing method, the heating temperature is between 80° C. and 90° C. (more preferably between 84° C. and 86° C.).

According to the first pasteurizing method, the heating temperature is maintained for a length of time of between 15 and 60 seconds, and more preferably, between 20 and 40 seconds.

According to a second pasteurizing method, the temperature is between 50° C. and 70° C. (more preferably between 64° C. and 66° C.).

According to the second pasteurizing method, the heating temperature is maintained for a length of time of between 15 and 40 minutes, and more preferably, between 20 and 35 minutes.

Preferably, according to another aspect, the step of pasteurizing the basic ingredients may comprise—after the step of heating the basic ingredients to a predetermined temperature for a predetermined length of time—a step of cooling the basic ingredients to a predetermined temperature (a step known as "pre-cooling").

According to yet another aspect, the step of adding a basic liquid to the mixture is followed by a step of aging the mixture.

In the aging step, the mixture is subjected to stirring and kept at a predetermined temperature (preferably between 0° C. and 7° C.).

The aging step allows the mixture to acquire a thicker consistency and to incorporate air more easily during the subsequent mixing and cooling process.

According to yet another aspect, the method comprises a step of cooling the basic mixture concentrate preceding the step of subjecting the basic mixture to a mixing and cooling treatment.

The cooling step follows the step of heating the basic mixture to cause an at least partial evaporation of the water contained in the basic ingredients.

In particular, the cooling step makes the basic mixture concentrate suitable for temporary storage (in suitable storage containers 2).

Preferably, therefore, after the step of cooling the mixture, the method comprises a step of temporarily storing the mixture prior to the mixing and cooling step.

Preferably, according to this aspect, the method comprises a step of preparing a capsule 2 and a step of (temporarily) storing the basic mixture concentrate inside the capsule 2.

It should be noted that temporarily storing the mixture inside the capsule 2 advantageously allows temporal separation between the production of the mixture concentrate and the production of the finished ice cream product (that is, the cooling and mixing step).

Advantageously, also, each capsule 2 contains the mixture needed to make one or more portions of ice cream, thus avoiding the need to make a large quantity of product and allowing implementation of a production-to-order system.

According to another aspect, the step of subjecting the basic mixture to a mixing and cooling treatment comprises a step of injecting a basic liquid product inside the capsule 2, and a step of mixing the basic liquid product with the basic mixture concentrate contained inside the capsule 2.

Preferably, the basic liquid product is a water based solution or is defined by water.

Alternatively, the basic product is a completion solution based on liquid ingredients.

According to yet another aspect, the step of mixing the basic liquid with the basic mixture concentrate contained inside the capsule 2 is performed inside the capsule 2.

According to this aspect, the basic liquid is injected into the capsule 2.

According to another aspect, after the step of mixing the basic liquid with the basic mixture contained inside the capsule 2, the method comprises a step of transferring the basic mixture (mixed with the basic liquid) into a processing container 3.

According to this aspect, the step of stirring and simultaneous thermal treatment is performed inside the mixing container 3.

It should be noted that during the mixing and cooling step, the basic mixture is treated at a temperature of between −11° C. and −3° C.

Preferably, the method comprises a step of homogenizing the basic mixture, performed before the step of heating the basic ingredients to cause an at least partial evaporation of the water.

Some of the above mentioned aspects of the method are now explained in more detail.

With reference to the capsule 2, it should be noted that the capsule 2 has a top wall, a bottom wall and a side wall connecting the top wall to the bottom wall.

These walls enclose an internal space containing one or more basic products.

Preferably, the capsule 2 is a deformable capsule (so that its internal containment space can be reduced).

More precisely, the side walls are preferably deformable.

The method described above is preferably implemented by an ice cream machine 1, illustrated schematically in FIG. 1.

The machine 1 is illustrated schematically in FIG. 1 and comprises:
  a processing container 3 defining a processing chamber 4;
  a stirrer 5 mounted inside the processing chamber 4;
  a thermal treatment system, provided with at least one heat exchanger associated with the processing container 3, for exchanging heat;
  a device 9 for receiving and housing a capsule 2 containing a basic mixture concentrate to make ice cream.

According to yet another aspect, the machine 1 comprises a nozzle 10 for piercing the capsule 2, designed to pierce the capsule 2, and a transfer duct (preferably connecting the piercing nozzle 10 to the processing container 3) to allow the mixture concentrate to be transferred from the capsule 2 to the processing container 3.

According to yet another aspect, the nozzle 10 for piercing the capsule 2 is connectable to a container for feeding a basic liquid product so as to allow the basic liquid product to be injected into the capsule 2.

According to yet another aspect, the machine 1 also comprises a pump (not illustrated) configured to allow the mixture concentrate to be transferred from the capsule 2 to the processing container 3.

Preferably, the pump is a gear pump.

Advantageously, the pump aerates the mixture while the mixture is being transferred, thus improving the properties of the mixture before it is mixed and cooled inside the container 3.

Preferably, the container 3 is a mixing and cooling cylinder.

According to another aspect, the machine 1 comprises a dispenser 6 operatively connected to the container 3 to allow the product contained inside the container 3 to be released to the outside of the container 3 itself.

What is claimed is:

1. A method for making ice cream, comprising the following steps:
   a) preparing basic ingredients defining a basic mixture for ice cream;
   b) heating the basic mixture to cause an at least partial evaporation of the water contained in the basic ingredients, so as to make a basic mixture concentrate;
   b.1) cooling the basic mixture concentrate, after the step of heating the basic mixture to cause the at least partial evaporation of the water contained in the basic ingredients;
   b.2) providing a capsule having deformable side walls so that the capsule is collapsible and storing the cooled basic mixture concentrate inside the capsule;
   c) subjecting the basic mixture concentrate to a mixing and cooling treatment comprising the steps of:
      c1) adding a basic liquid to the basic mixture concentrate, so as to dilute the basic mixture concentrate;

c1.1) aging the diluted basic mixture concentrate while stirring the diluted basic mixture concentrate at a temperature between 0° C. and 7° C. after the step of adding the basic liquid to the basic mixture concentrate;

c2) stirring and simultaneous thermal treatment of the diluted basic mixture concentrate at a temperature of between −11° C. and −3° C. for a predetermined period of time, to allow converting the diluted basic mixture concentrate into an ice cream product;

wherein the step b) comprises, during the heating, subjecting the basic ingredients to a pressure below atmospheric pressure in a range of between 7 kPa and 20 kPa;

pasteurizing the basic ingredients after the step a) and prior to the step b) by maintaining a pasteurizing temperature for a length of time between 15 and 40 minutes;

homogenizing the basic mixture before the step b).

2. The method according to claim 1, wherein the step b) comprises a step of heating the basic ingredients to a temperature ranging between 40° C. and 60° C.

3. The method according to claim 1, wherein the step of subjecting the basic mixture concentrate to a mixing and cooling treatment comprises a step of injecting a basic liquid product inside the capsule, and a step of mixing the basic liquid product with the basic mixture concentrate contained inside the capsule.

4. The method according to claim 3, wherein the step of mixing the basic liquid with the basic mixture concentrate contained inside the capsule is performed inside the capsule.

5. The method according to claim 3, comprising, after the step of mixing the basic liquid with the basic mixture concentrate contained inside the capsule, a step of transferring the basic mixture inside a processing container and wherein the step of stirring and simultaneous thermal treatment is performed inside the processing container.

6. The method according to claim 2, comprising a step of cooling the basic mixture concentrate, after the step of heating the basic mixture to cause an at least partial evaporation of the water contained in the basic ingredients, and a subsequent step of storing the cooled basic mixture concentrate.

7. The method according to claim 1, wherein the step of subjecting the basic mixture concentrate to a mixing and cooling treatment comprises a step of injecting a basic liquid product inside the capsule, and a step of mixing the basic liquid product with the basic mixture concentrate contained inside the capsule.

8. The method according to claim 7, wherein the step of mixing the basic liquid with the basic mixture concentrate contained inside the capsule is performed inside the capsule.

9. The method according to claim 8, comprising, after the step of mixing the basic liquid with the basic mixture concentrate contained inside the capsule, a step of transferring the basic mixture inside a processing container and wherein the step of stirring and simultaneous thermal treatment is performed inside the processing container.

10. The method according to claim 7, comprising, after the step of mixing the basic liquid with the basic mixture concentrate contained inside the capsule, a step of transferring the basic mixture inside a processing container and wherein the step of stirring and simultaneous thermal treatment is performed inside the processing container.

11. The method according to claim 1, and further comprising providing that the deformable side walls have a bellows shape.

\* \* \* \* \*